US010187399B2

(12) United States Patent
Katz

(10) Patent No.: US 10,187,399 B2
(45) Date of Patent: Jan. 22, 2019

(54) ENRICHED SYSTEM FOR SUSPICIOUS INTERACTION RECORD DETECTION

(71) Applicant: Passport Health Communications, Inc., Franklin, TN (US)

(72) Inventor: Elazar Katz, Boynton Beach, FL (US)

(73) Assignee: PASSPORT HEALTH COMMUNICATIONS, INC., Franklin, TN (US)

( * ) Notice: Subject to any disclaimer, the term of this patent is extended or adjusted under 35 U.S.C. 154(b) by 178 days.

(21) Appl. No.: 15/053,765

(22) Filed: Feb. 25, 2016

(65) Prior Publication Data

US 2016/0301706 A1 Oct. 13, 2016

Related U.S. Application Data

(60) Provisional application No. 62/143,891, filed on Apr. 7, 2015.

(51) Int. Cl.
*H04L 29/06* (2006.01)

(52) U.S. Cl.
CPC ................ *H04L 63/1408* (2013.01)

(58) Field of Classification Search
CPC .................................................. H04L 63/1408
See application file for complete search history.

(56) References Cited

U.S. PATENT DOCUMENTS

| 7,660,748 | B2* | 2/2010 | Archer | G06Q 30/02 |
| | | | | 705/26.82 |
| 7,836,088 | B2* | 11/2010 | Chavda | G06Q 10/107 |
| | | | | 707/795 |
| 8,214,497 | B2* | 7/2012 | Alperovitch | G06F 21/554 |
| | | | | 709/226 |
| 8,271,506 | B2* | 9/2012 | Martinez | G06F 17/30292 |
| | | | | 707/755 |
| 8,290,838 | B1* | 10/2012 | Thakur | G06Q 40/02 |
| | | | | 705/35 |
| 8,332,323 | B2* | 12/2012 | Stals | G06Q 20/02 |
| | | | | 235/379 |
| 8,352,467 | B1* | 1/2013 | Guha | G06F 17/30864 |
| | | | | 707/727 |
| 8,407,282 | B2* | 3/2013 | Cogan | G06F 17/30702 |
| | | | | 709/203 |
| 8,566,347 | B1* | 10/2013 | Patil | G06F 17/30342 |
| | | | | 707/769 |
| 8,639,520 | B2* | 1/2014 | Finn | G06Q 20/201 |
| | | | | 705/2 |

(Continued)

*Primary Examiner* — David Garcia Cervetti
(74) *Attorney, Agent, or Firm* — Merchant & Gould

(57) ABSTRACT

Systems and methods for improved detection of fraud, waste, and abuse are provided, based on the analysis of enriched relationships and aggregated metrics thereof. An enriched relationship record associates patient and provider information to provide an enhanced view of patient data, provider data, and interaction data for a given entity. Aggregated metrics provide an enhanced view of a particular entity's activities based on the entity's interactions with other entities and data and metadata from the related entities' enriched relationship records. The enriched relationship records and aggregated metrics may be used to audit the entity and produce a report indicative of suspicion levels for the entity engaging in fraud, waste, or abuse.

20 Claims, 5 Drawing Sheets

(56) References Cited

U.S. PATENT DOCUMENTS

| | | | | |
|---|---|---|---|---|
| 8,732,293 B2* | 5/2014 | McDaniel | H04L 67/306 | 709/224 |
| 8,874,619 B2* | 10/2014 | Mack | G06F 17/30129 | 707/609 |
| 8,955,154 B2* | 2/2015 | Stibel | G06Q 30/0251 | 713/170 |
| 8,965,848 B2* | 2/2015 | Caceres | G06F 17/30303 | 707/626 |
| 9,027,135 B1* | 5/2015 | Aziz | H04L 63/1408 | 726/23 |
| 9,117,193 B2* | 8/2015 | Brignull | G06Q 10/10 | |
| 9,154,640 B2* | 10/2015 | Goldfarb | H04M 15/00 | |
| 9,171,081 B2* | 10/2015 | Ganjam | G06F 17/30864 | |
| 9,208,179 B1* | 12/2015 | Song | G06F 17/30067 | |
| 9,342,692 B2* | 5/2016 | Agrawal | G06F 21/56 | |
| 9,679,259 B1* | 6/2017 | Frind | G06N 99/005 | |
| 2003/0023593 A1* | 1/2003 | Schmidt | G06F 17/30539 | |
| 2004/0059701 A1* | 3/2004 | Fedorov | H04M 3/5183 | |
| 2004/0103181 A1* | 5/2004 | Chambliss | H04L 41/024 | 709/223 |
| 2004/0215793 A1* | 10/2004 | Ryan | G06Q 50/01 | 709/229 |
| 2006/0149591 A1* | 7/2006 | Hanf | G06Q 10/10 | 705/2 |
| 2006/0179025 A1* | 8/2006 | Bechtel | G06N 5/025 | 706/45 |
| 2007/0129977 A1* | 6/2007 | Forney | G06F 17/30873 | 715/745 |
| 2007/0130170 A1* | 6/2007 | Forney | G06F 17/30286 | |
| 2007/0156766 A1* | 7/2007 | Hoang | G06F 17/30014 | |
| 2008/0235216 A1* | 9/2008 | Ruttenberg | G06F 17/30867 | |
| 2009/0089317 A1* | 4/2009 | Ford | G06F 17/30604 | |
| 2009/0099862 A1* | 4/2009 | Fireman | G06F 19/3418 | 705/2 |
| 2009/0313102 A1* | 12/2009 | Le Roy | G06F 17/30958 | 705/14.25 |
| 2010/0076987 A1* | 3/2010 | Schreiner | G06Q 30/02 | 707/754 |
| 2010/0094767 A1* | 4/2010 | Miltonberger | G06Q 10/067 | 705/325 |
| 2010/0114628 A1* | 5/2010 | Adler | G06Q 10/063 | 705/7.11 |
| 2010/0114629 A1* | 5/2010 | Adler | G06Q 10/00 | 705/7.36 |
| 2010/0114630 A1* | 5/2010 | Adler | G06Q 10/06 | 705/7.36 |
| 2010/0161662 A1* | 6/2010 | Jonas | G06F 17/30539 | 707/780 |
| 2011/0035444 A1* | 2/2011 | Hill | G06Q 10/10 | 709/204 |
| 2011/0055072 A1* | 3/2011 | Lee | G06Q 40/02 | 705/38 |
| 2011/0093472 A1* | 4/2011 | Dumant | G06F 17/30539 | 707/748 |
| 2011/0131208 A1* | 6/2011 | Goldfarb | G06F 17/30867 | 707/736 |
| 2012/0159647 A1* | 6/2012 | Sanin | H04L 51/32 | 726/28 |
| 2015/0026027 A1* | 1/2015 | Priess | G06Q 40/00 | 705/35 |
| 2015/0046332 A1* | 2/2015 | Adjaoute | G06N 5/043 | 705/44 |
| 2015/0170147 A1* | 6/2015 | Geckle | G06Q 20/4016 | 705/44 |
| 2015/0242856 A1* | 8/2015 | Dhurandhar | G06Q 50/01 | 705/44 |
| 2016/0034560 A1* | 2/2016 | Setayesh | G06F 17/2785 | 707/739 |
| 2016/0086185 A1* | 3/2016 | Adjaoute | G06Q 20/4016 | 705/44 |
| 2016/0224993 A1* | 8/2016 | Miller | G06Q 30/0201 | |

* cited by examiner

ENRICHED SYSTEM FOR SUSPICIOUS INTERACTION RECORD DETECTION

RELATED APPLICATIONS

This application claims priority from U.S. Provisional Patent Application No. 62/143,891 titled, "ENRICHED RELATIONSHIPS FOR FRAUD DETECTION" and having a filing date of Apr. 7, 2015, which is incorporated herein by reference.

BACKGROUND

Healthcare fraud, waste, and abuse is estimated to exceed $200 billion per year. Rogue healthcare service providers (physicians, ambulance services, homecare providers, etc.) perpetrate most of the fraud, waste, and abuse, which negatively impacts the affordability of healthcare throughout the healthcare system. Fraud similarly affects several industries. Previous efforts to prevent fraud, waste, and abuse focused on examining individual claims, which is resource intensive and often requires the fraud, waste, and abuse to be extreme for it to be detected.

It is with respect to these and other considerations that examples will be made.

BRIEF SUMMARY

Systems and methods for the improved detection of fraud, waste, and abuse (collectively, fraud) are provided herein, based on the analysis of enriched relationships and aggregated metrics thereof. An enriched relationship record, when applied in the healthcare setting, associates patient and provider information to provide an enhanced view of patient information, provider information, and interaction information for a given entity (e.g., a patient or a provider). As will be understood, the term 'patient' refers to an entity receiving or paying for services and the term 'provider' refers to the entity providing services, and the terms may refer to entities in industries other than the healthcare industry, such as: automobile insurance, credit card, inspection/certification, etc. According to aspects, healthcare providers include practice groups and individual providers within a practice group (e.g., a hospital system and a hospital, a surgery group and a surgeon, an ambulance service and a driver, etc.). The enriched relationship records may be aggregated to combine data and metadata from multiple enriched relationship records to create unique metadata for use as aggregated metrics. The enriched relationships and aggregated metrics are compared against rules, which may be provided as part of an audit of an entity.

Audits that make use of enriched relationships and aggregated metrics are operable to provide enhanced detection of suspicious activities (e.g., potentially fraudulent, wasteful, or abusive behavior). Example audits process and compare the enriched relationship records and aggregated metrics to a set of rules to detect correlations indicative of suspicious activities, which may have been missed when using prior systems or methods. According to aspects, an audit may use an enriched relationship record that has been continually updated or taken as a snapshot for a period of time.

Aspects of systems and methods described herein may be practiced in hardware implementations, software implementations, and in combined hardware/software implementation. This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the claimed subject matter. In the drawings:

DETAILED DESCRIPTION

Figure 1:
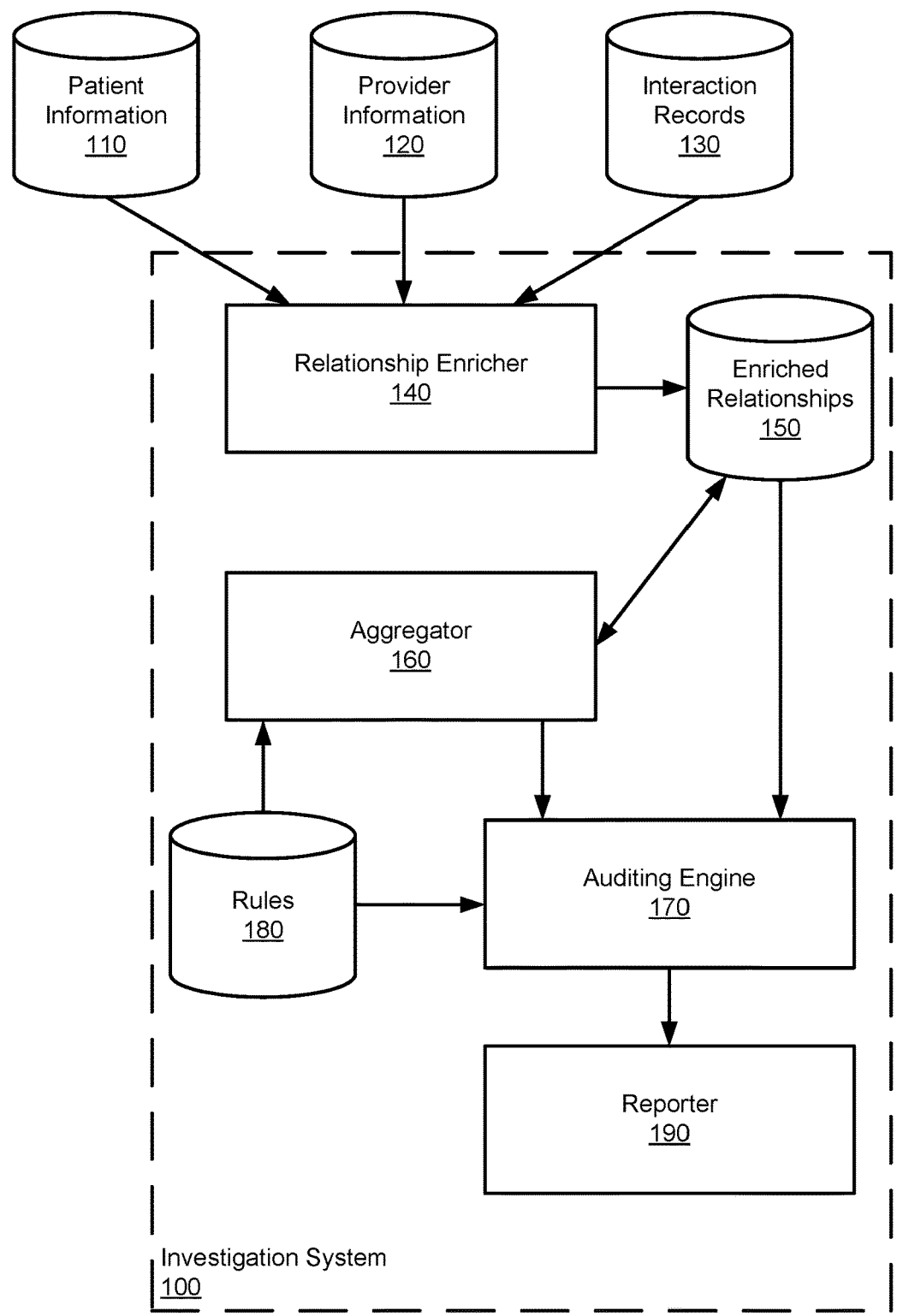
FIG. 1 illustrates a block diagram of an example system providing enriched relationships.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods for the improved detection of fraud, waste, and abuse (collectively, fraud) are provided herein, based on the analysis of enriched relationships and aggregated metrics thereof. Audits that make use of enriched relationships and aggregated metrics compare them to a set of rules to detect correlations indicative of suspicious activities, which may have been otherwise missed or disregarded when using prior systems or methods. A system that has been notified of suspicious activities may then focus its resources on analyzing the suspicious entity and thus save resources in not investigating entities that are not suspicious.

When a profile for an entity is enriched, patient information, provider information, and records of interactions between patients and providers are collected and processed to build a cross-correlated enriched relationship. An enriched relationship record may include entity profile information, links to related entities (e.g., the entities used to enrich the entity profile), and aggregated metrics based on information from the related entities.

The enriched relationships may be aggregated to combine data and metadata from multiple enriched relationship records to create combined-entity profiles and aggregated metrics. In various examples, aggregated metrics reflect various statistical analyses of properties of the related entities. Combined-entity profiles may be used as part of creating an aggregated metric, in which an analysis of the population of entities is made, and in some examples, a shared feature (e.g., common income level, shared geographic region, the same employer, etc.) is used to refine which related entities are analyzed. As will be understood, the term 'patient' refers to an entity receiving or paying for services and the term 'provider' refers to the entity providing services, and the terms may refer to entities in industries other than the healthcare industry; the healthcare industry is just one industry in which enriched relationships for fraud detection may be applied.

Because funds used to pay for fraudulent services are often difficult or impossible to recover once disbursed, payors have an interest in being quickly alerted to suspicious entities so that payments may be delayed or halted when suspicions arise. Competing with the payors' interest, which can add time to processing claims when investigating fraud, providers have an interest in receiving prompt payment for services rendered, or being quickly alerted to changes in payment timing, so that they may maintain healthy cash flows for their businesses. Therefore, enriched relationships include time sensitive data that needs to be presented to both payors and providers. To ensure that the enriched relationships are communicated to the interested parties in a timely manner, reports are generated and transmitted to interested parties by various methods to bring suspicions of fraud to their attention. These reports may include sections that are human-readable or machine-readable, to interact with payment systems for the parties. Further, by examining entities based on enriched relationships rather than on a transaction-by-transaction basis, less memory is used than in prior systems and methods used to determine whether fraud has occurred.

FIG. 1 illustrates a block diagram of an example investigation system 100 providing enriched relationships. The investigation system 100 is illustrated as a dashed box encompassing several modules and databases in communication with several external databases. In other examples, more or fewer external databases are communicated with, and the illustrated modules and databases may be combined or further specialized.

As illustrated, data and metadata are retrieved from external databases by the investigation system 100. For example, a patient information database 110, operable to provide the investigation system 100 with information about patients (e.g., data and metadata) according to applicable medical privacy laws. Example information about patients may include, but is not limited to: residence (e.g., address, distance to service provider, distance to other service providers, etc.), income, lifestyle (e.g., smoker, vegan, exercises regularly, officer worker, etc.), employment, age, gender, prior health conditions, prior medical services requested, future medical services expected (e.g., scheduled appointments, persistent prescriptions, chronic conditions, etc.) other medical service providers, insurance information, unique identifiers (e.g., social security numbers (SSN), policy numbers, index keys, etc.), etc.

Similarly, a provider information database 120 is operable to provide the investigation system 100 with information about service providers. Example information about service providers may include, but is not limited to: location, size of location (e.g., square footage), services provided, income, number of patients, parents/sub-providers (e.g., status and position within a larger service provider organization), prior employers, date of incorporation, certifications, red flags, number of claims filed, number of claims rejected/accepted/modified, unique identifiers (e.g., tax filing numbers, licensing information, index keys, etc.), etc.

Additionally, an interactions records database 130 is operable to provide the investigation system 100 with information about interactions between providers and patients. For example, interactions may include any record from which information relating a patient with a provider is retrieved from, such as, for example: credit checks; registrations; eligibility checks; encounter reports; and reimbursement claims to an insurance provider, governmental health program (e.g., Medicaid or Medicare), or individual Health Savings Account (HSA) manager. Example information about interactions may include, but is not limited to: provider information; patient information; amount charged, requested, or allowed; service/treatment provided; diagnosis description; date; unique identifiers (e.g., transaction numbers, index keys, etc.), etc. In one example, interaction records are used to build a patient information database 110, a provider information database 120, and the interaction records database 130.

The information in the databases may be supplemented with additional external information (e.g., incorporation information from the appropriate Secretary of State's website, a database hosted by a Department of Health, income data from the Internal Revenue Service, insurance/payment registration data, etc.) and may be periodically updated.

As will be understood, multiple sources for each database may be communicated with, and one device or dataset may provide combined databases or multiple databases. For example, information from two patient information databases 110 may be retrieved. Additionally, provider information and interaction records may be provided by an interaction records database 130.

The investigation system 100 is illustrated as including a relationship enricher 140 operable to retrieve data and metadata from the various databases and process those data and metadata to create enriched relationship records. In various examples, the enriched relationship records may be stored in an enriched relationships database 150. The relationship enricher 140 is operable to collect information from various sources to link within an enriched relationship record. For example, a record may be created for an entity (e.g., a patient or provider) to view a history of its interactions to detect suspicious activities related to fraud, waste, or abuse. For example, patients may be associated with a doctor based on submitted interaction records (e.g., insurance claims) so that information may be analyzed to review the doctor for suspicious activities. In another example, multiple providers may be associated with an individual patient based on submitted interaction records, so that information may be analyzed to review the patient for suspicious activities.

According to aspects, enriched relationship records are operable to focus on patients or providers; either entity related to an interaction may be the focus. The interaction records are parsed by the investigation system 100 to determine the entities involved, and what the interaction between those entities was. One of the entities is selected as the focus, and the interaction records that involve the focused entity are aggregated into an enriched relationship record for that entity. The enriched relationship record will include various properties related to the focused entity, such as, for example, the average number of interactions with other entities during a time period, an average price associated with interactions, the overall and average numbers of a given interaction type (e.g., physical exams, opioid prescriptions, supplemental lab tests). In various aspects, the investigation system 100 aggregates interaction records for all the entities which are parsed from the interaction records, while in other aspects, only specified entities have their interaction records aggregated.

For example, by focusing on patients, an enriched relationship record may show all the service providers and interactions related to an individual patient, which may be useful for identifying patient-centric suspicious activities (e.g., multiple prescriptions for opiates from multiple healthcare providers, "shopping" for a diagnosis, etc.). Similarly, for example, by focusing on providers, an enriched relationship record may show all the patients of and claims submitted by an individual provider, which may be useful in identifying provider-centric suspicious activities (e.g., services for patients who are outside of the provider's area, too-frequent claims for a patient, inflated claims for a location, etc.).

The enriched relationship records are operable to provide continuously developed or time-windowed views of the information. A continuously developed view includes all information retrieved since the creation of the enriched relationship record. In contrast, a time-windowed view specifies a start and an end time from which information is to be examined. For example, a six-month window may specify that data from the previous six months is to be examined. Time-windowed views may be of particular use when a change in health laws, growth of a practice, or other event would make a short-term analysis advantageous.

Fraudulent entities, when they fall under suspicion, often reincorporate their businesses under new names, or use aliases when shopping for services so that they may "start fresh" under a new name/alias that is not under suspicion. Additionally, multiple providers may assign different unique identifiers to the same patient, or the patient's details may change over time, such as, for example, moving to a new address, name changes, switching insurance providers, etc. Therefore, the relationship enricher 140 is operable to use multiple data sources to form a confidence score of whether a given entity matches an existing entity. For example, the relationship enricher 140 may access patient information 110 from two providers that give the patient different unique identifiers and a different name (e.g., due to one provider using a maiden name and the other a married name for the patient), but identical contact information and insurance information, which the relationship enricher 140 is operable to compare to determine a likelihood that the "different" patient records refer to the same person. Different aspects of an entity's information may be weighted differently by the relationship enricher 140 when determining whether multiple records refer to the same entity or different entities. For example, a provider's address may be weighted more heavily than its name, but not as heavily as its registered agent or shareholders, which may be obtained, for example, from a secretary of state's database.

The investigation system 100 is illustrated as including an aggregator 160, operable to aggregate and process multiple enriched relationship records to produce combined-entity profiles and aggregated metrics. The aggregator 160 is operable to perform statistical analyses and filtering operations on enriched profiles when they are aggregated. Aggregated metrics may be added to the enriched profiles (e.g., to indicate a category or relationship for the entity), used to update or set auditing rules, or be compared against auditing rules in an audit.

In various examples, the aggregator 160 may aggregate several enriched relationship records to determine a statistical baseline for properties of the aggregated enriched relationship records for use as an aggregated metric (e.g., the average distance property for a patient to a provider). The statistical baselines may be taken from the entire population of enriched relationship records or may be refined to a subset based on a shared feature of the enriched relationship records (e.g., a shared region, a shared provider, etc.). Statistical baselines include, but are not limited to: mean value for a property, median value for a property, mode value for a property, range of values for a property, distribution of values for a property, central tendency of the property, etc.

In various examples, the statistical baselines for several properties may be used to create a combined-entity profile. For example, when using a shared feature of a geographic region (e.g., city, county, state, distance from a given point, etc.), the other properties (e.g., income, age, gender, square footage, etc.) can be combined into a profile for that geographic region. The combined-entity profiles may be stored as separate entries in the enriched relationship database 150, cached within enriched relationship records with the shared feature (e.g., all patients and providers in the geographic region would include the statistical baselines), or discarded after use in an audit.

In other examples, the aggregator 160 is operable to examine an enriched relationship record and a statistical baseline to determine aggregated metrics based on statistical rules. Statistical rules that are applied to create aggregated metrics from a given property may include, but are not limited to: standard deviations (1σ, 1.5σ, 6σ, etc.), trend analyses (e.g., runs), and pattern identifications. Various statistical rules may be used with the same property. For example, aggregated metrics may be created to show what percentage of a doctor's patients live within one standard deviation of the statistical baseline for average distance to a provider's office and what percentage live within two standard deviations. According to system settings, the aggregated metric may indicate a percentage, a count (e.g., 12 patients within 1σ instead of 5% within 1σ), or a most/least frequent non-numeric output (e.g., job type of "surgeon", diagnosis code of "312.32", etc.).

The investigation system 100 is illustrated as including an auditing engine 170 operable to execute audits using enriched relationships and aggregated metrics. The auditing engine 170 is invoked when an audit is triggered, which in various examples, may be triggered on a periodic basis (e.g., every three months), whenever a new interaction record (e.g., a claim, patient intake, credit check, etc.) is submitted, or based on a user command. In various aspects, the trigger specifies a focus entity for the audit (e.g., a patient or provider) and whether the view is to be time-windowed. The auditing engine 170 is operable to receive the trigger and retrieve the appropriate enriched relationship records, aggregated metrics, and auditing rules based on the trigger.

When an audit is triggered, the auditing engine 170 is operable to compare the enriched relationship records and aggregated metrics against auditing rules stored in a rules database 180 to determine whether suspicious activity has occurred and a level of how suspicious an entity is. Various auditing rules define and set thresholds for suspicious activities. For example, when auditing an ambulance company, an auditing rule may define that a "driving distance" property for an interaction more than two times the average distance of the property is a suspicious activity. When the entity's activities, as indicated by the enriched relationship record, fall outside of a threshold during an audit (i.e., are above and/or below the threshold, depending on the threshold), it may be deemed suspicious, and a report is generated that indicates that the entity is suspicious. A threshold may also be set that allows a specified number of suspicious activities for a given property before flagging the entity as suspicious or raising the suspicion level of an entity. A threshold thus allows variation within a property to prevent false positives in the audit without ignoring suspicious activities.

By auditing the enriched relationships, instead of individual claims against various rules, the auditing engine 170 is operable to improve the functioning of the computer device on which audits are run, compared to a prior system. In prior systems, each claim was examined when it was submitted, causing the system to use memory and processing power to perform that examination. For example, if a given doctor were to see forty patients in a day, a prior system would need to perform up to forty audits per day to process the associated claims (or the equivalent number on a less/more frequent basis), or the system would need to sample the claims, letting some claims go unaudited, whereas the auditing engine 170 is operable to perform one audit on the doctor, the office, or a given patient. Additionally, prior systems are more prone to producing false positives when searching for suspicious claims, which may lead to the delayed payment of otherwise valid claims. For example, if a doctor were to see a patient vacationing near the doctor's office from far away, a prior system examining the doctor's claim for reimbursement might return a false positive for a suspicious claim due to the patient not living near the doctor, whereas the auditing engine 170 can account for the occasional out-of-town patient via a threshold.

The auditing engine 170 is operable to use several rules and thresholds together in an audit, which may have its own additional rules and thresholds. For example, a rule/threshold pair for an "office space size" property may be used together with a rule/threshold pair for "number of employees" property when auditing a provider to correlate the two properties to determine whether the provider has a suspicious number of employees for its office size. In another example, an audit may use a combined threshold for several rules violations so that when n suspicious activities are detected from the examined properties, the entity is flagged as suspicious or its suspicion level is increased. For example, a combined threshold of three violations may flag an entity as suspicious when three separate rules are violated once each, one rule violated three separate times, etc.

As will be understood, different rules may be given different weights when determining how suspicious an entity is. For example, a patient having violated a high-weight rule may be flagged immediately as suspicious. In contrast, a patient having violated a low-weight rule may not be flagged as suspicious (or may be set to a low suspicion level) unless another violation is detected (e.g., a different rule is violated or this rule is violated multiple times). The number of unique rules violated within an enriched relationship may also affect the weighting. For example, a patient included in a provider's enriched relationship record with twelve violations may affect the suspiciousness level of the provider more than twelve patients with one violation each. Thus, a combined review allows for several small violations to be given the same weight as a single large violation when determining whether an entity should be flagged as suspicious.

Exceptions may also be applied by the auditing engine 170 to lower a suspicion level for an entity. Example exceptions may be based on the enriched relationship record (e.g., a provider may be considered not suspicious until it has operated for a month), aggregated metrics (e.g., a provider with a higher than normal percentage of low-income patients may have an exception for a percentage Medicare/Medicaid requests), or be applied by a user.

The auditing engine 170 is operable to weight rules/thresholds differently according to the audit. For example, when auditing doctors in a tourist-heavy region during vacation season, when more patients from far away may use the doctor's services, the property of "distance between patient and provider" may have its rule relaxed (e.g., a larger variation is used to define the rule), its threshold raised, or any flags raised weighted less against a combined threshold. Alternatively, because doctors in the tourist-heavy region have had access to patient information, there may be a greater risk for fraud in the off-season, therefore stricter rules, lower thresholds, and higher weights may be applied during the off-season, when fewer patients from far away are expected to use the doctor's services.

The auditing engine 170 may operate from an initial state of suspicion or an initial state of trust for various entities. For example, a new provider may be treated as suspicious until it has been determined by the auditing engine 170 to be trusted after several transactions. As a result, the provider under suspicion (or treating a patient under suspicion) may be required by the payor to request permission before performing a procedure, rather than requesting payment for an already performed procedure. As will also be understood, providers and patients may slide in and out of suspicion due to ongoing analyses of transactions and enriched relationships by the auditing engine 170 that update their levels of suspicion.

The auditing engine 170 transmits its results to a reporter 190 operable to provide feedback based on the results of the auditing engine 170. In one example, the reporter 190 produces a report only when suspicious activities have been found and an entity flagged as having a suspicion level above a threshold (e.g., an alert). In another example, the reporter 190 produces a report after every audit, which may include a suspicion level for an entity. Example reports may include various levels of detail describing how the auditing engine 170 reached its result, and may be assembled according to a format stored by the reporter 190 or specified by a user. Example reports may include natural language explanations of the suspicion level(s), graphs, infographics, and numeric scores, which may be provided to a user via a suitable display device (e.g., monitor, printer, speaker, etc.), cached, or passed to another system for further use and analysis.

Because of the difficulties associated with recovering payments made to parties engaging in fraud, it may be advantageous to ensure that the report is processed or viewed before any further payments come due for disbursement to a suspicious party. The reporter 190 is therefore operable to transmit the report (or a summary thereof) to a third party to the interaction records, such as a payor, via several different forms of hardware. In various aspects, the reporter 190 includes a network interface, to transmit the report as an email, Rich Site Summary (RSS) feed, or directed message to a payor's system encoded for transmission via a network, such as the internet. In additional aspects, the reporter 190 includes a telephone interface, operable to transmit the report as a facsimile over the public switched telephone network to a designated fax machine or as a machine-rendered text-to-speech translation of the report to a designated telephone. In other aspects, the reporter 190 includes a cellular interface, operable to transmit the report as a text message or as a machine-rendered text-to-speech translation of the report to a cellular device designated by the payor. Additionally, due to the difficulties that being placed under suspicion may cause an entity, such as a provider, the reporter 190 is operable to use the hardware (network interface, telephone interface, cellular interface, etc.) used to transmit reports (or summaries thereof) to payors for transmitting a report (or a summary thereof) to an affected entity.

In various aspects, the reporter 190 may require an entity to respond to the report with additional information within a response window for a procedure to be approved or a payment to be released. Such additional information may be used by the auditing engine 170 to correct typographical errors, data mis-entry, etc., but also to catch suspicious entities in acts of fraud by exposing inconsistent transactions. By limiting the response window's duration, the payor may reduce the likelihood that a potentially fraudulent entity can construct a fraudulent transaction that is consistent with itself or previous fraudulent transactions. For example, an inconsistent transaction may report a different demographic property (e.g., race, height, address, income) for a patient than previously reported. A non-fraudulent entity, in contrast, when requested for additional information is expected to have internally consistent data, which may be used when compared with the enriched relationship records for the involved entities. For example, a provider may be asked to provide additional information about a patient that is accessible when the patient is a real person, but not necessary for the patient's treatment, such as, for example, work address, last visit to the provider, emergency contact, etc. The additional information is compared to data within the enriched relationship record, and when consistent, is used to release an approval message to the payor to approve the procedure or release payment for the procedure.

Figure 5:
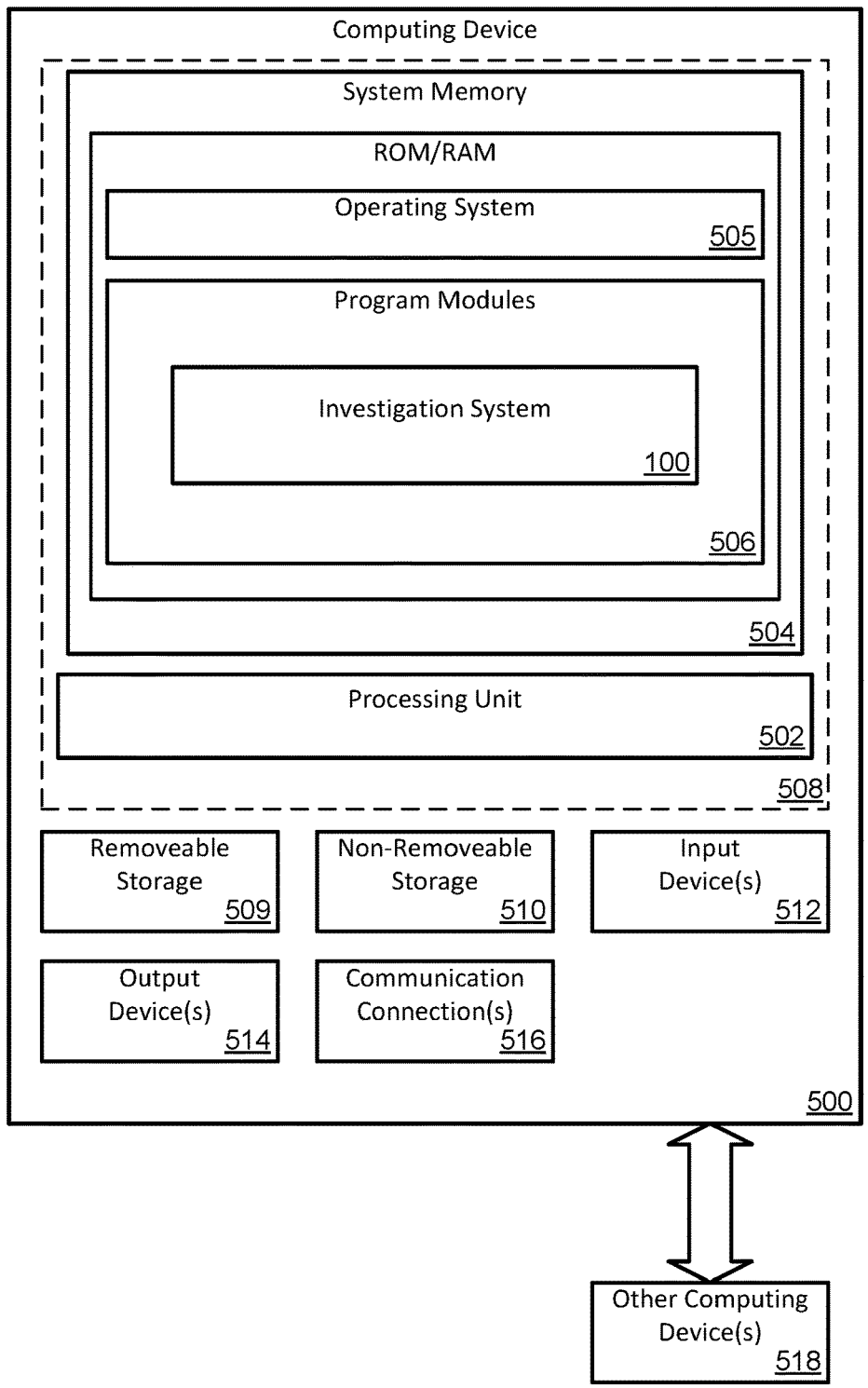
FIG. 5 is a block diagram illustrating physical components of an example computing device with which aspects may be practiced.

As used herein, the term "module" is used to describe an individual computing device having a processor, memory, and other computer components as discussed in further detail in relation to FIG. 5. In various aspects, the functions ascribed to the modules are provided by operating instructions hardcoded into the modules, or computer executable instructions executed by the processor. Alternatively, the term "module" represents the set of software instructions stored by a memory storage device that are executed by the processor to perform the function described herein. Each of the modules described above may operate independently on a separate computer system in communication with the other modules or two or modules may be integrated within a single computer system.

Figure 2:
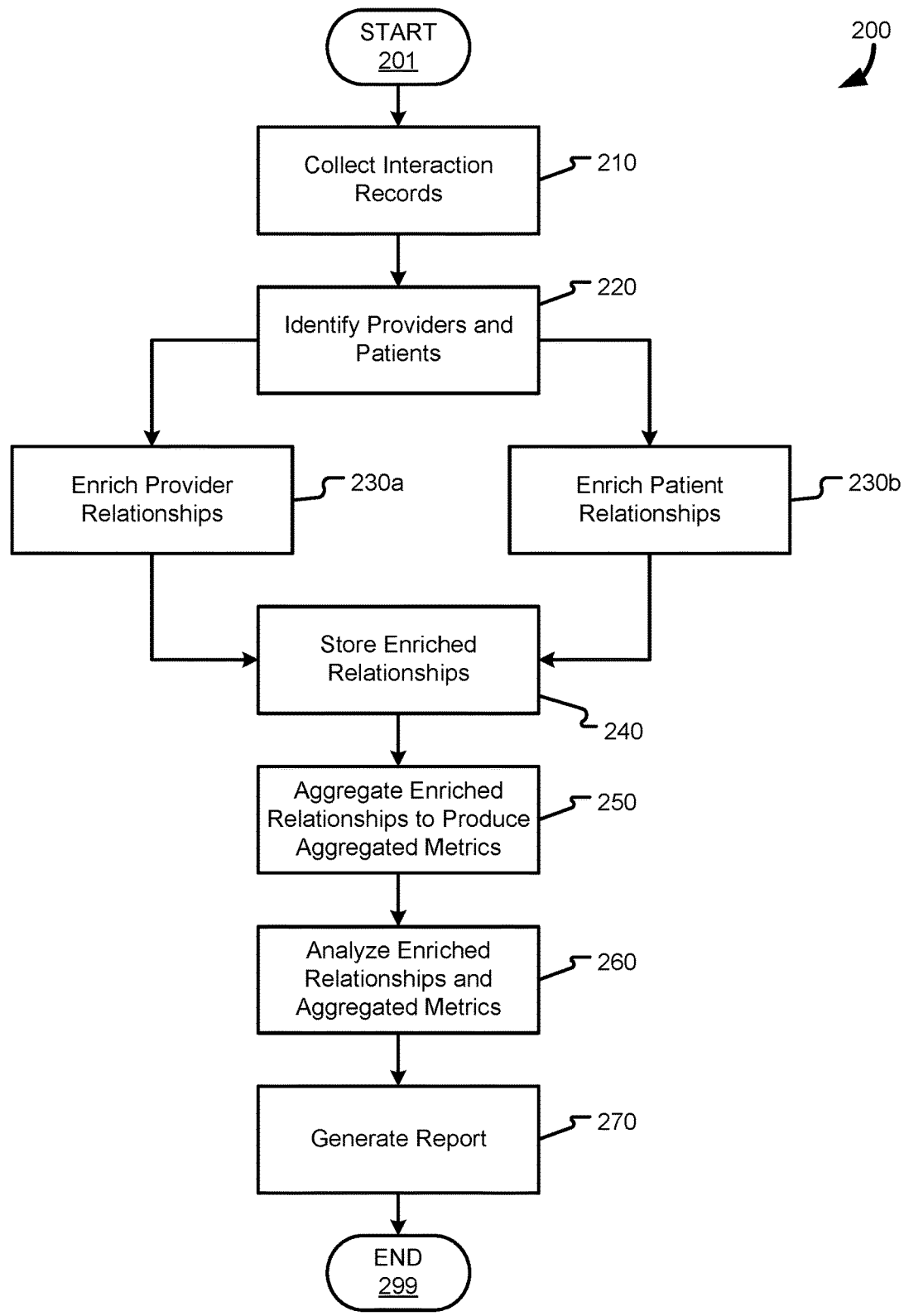
FIG. 2 illustrates a flow chart for an example method for improved detection of healthcare fraud.

FIG. 2 illustrates a flow chart for an example method 200 to detect healthcare fraud. Method 200 begins at START 201 and proceeds to OPERATION 210, where interaction records are collected. Example interaction records include, but are not limited to patient intake forms, eligibility checks, encounter reports, claims for insurance reimbursement, credit checks, etc. Interaction records may be collected via submission to a database hosted by a healthcare provider, insurance provider, credit agency, governmental agency, healthcare monitor (e.g., the World Health Organization, Centers of Disease Control and Prevention, etc.), and combinations thereof.

Once interaction records have been collected, they are parsed at OPERATION 220 to identify providers and patients in the records. Providers include individual healthcare providers (e.g., doctors, nurses, paramedics, ambulance drivers, etc.) and provider organizations (e.g., hospitals, practice groups, hospice services, ambulance companies, etc.). Patients include individuals and organizations receiving medical services from providers as well as the individuals and organizations responsible for paying for medical services. For example, both a child and a parent may be identified as patients from an interaction as the child may receive medical services and the parent may be responsible for paying for the medical services.

Enriched relationship records are created at OPERATION 230*a* and OPERATION 230*b* for providers and patients respectively. According to aspects, an initial profile or existing enriched relationship may be further enriched or updated at OPERATIONS 230*a-b*. An enriched relationship record is created to associate providers with patients, or vice versa, so that information about multiple served/serving entities can be used to provide an enhanced view of how (and to/from whom) the entity provides/consumes healthcare services. In one example, an enriched relationship record associates one provider with one patient. In other examples, many patients are associated with one provider, or many providers are associated with one patient.

Information used to enrich a relationship record includes interaction information (e.g., what the services were, how much they cost, when they occurred, etc.), provider information (e.g., location, current business metrics, previous businesses, certifications, prior suspicion levels, etc.), and patient information (e.g., residence, demographics, lifestyle, credit history, prior suspicion levels, etc.). In some examples, a patient medical history or classification (e.g., diabetic, obese, prone to sports-injuries, elderly, non-ambulatory, etc.) may be retrieved to further identify the patient's expected future medical needs.

Method 200 then proceeds to OPERATION 240 where the enriched relationship records are stored. In various aspects, the enriched relationship records may be stored in various databases, such as an enriched relationship database 150, according to various structures and methods of organization.

The stored enriched relationship records are aggregated at OPERATION 250 to produce aggregated metrics. Aggregated metrics are produced according to statistical rules and are based on the properties and information of related entities associated with the enriched relationship record of an entity. Various aggregated metrics may be produced for a given property (i.e., an aspect of the information) based on different statistical rules (e.g., a mean value, a median value, a range, etc.).

Additionally, enriched relationship profiles may be aggregated to produce combined-entity profiles. Example combined-entity profiles may represent an entire population or a subset of the population based on a shared feature of a plurality of stored enriched relationship records, such as, for example, a shared geographic region, medical specialty, gender, square footage, etc. Combined-entity profiles may be used to determine a norm for a subset of the population of entities having stored enriched relationship records. Example subsets for providers may include specialties, practice groups, companies, healthcare alliances, etc. Similarly, the enriched relationship records of patients may be used to create profiles for neighborhoods, regions, population groups, etc. In various aspects, the combined-entity profiles are populated with aggregated metrics for the combined entity, such that the information associated with the combined-entity profile provides statistical baselines for several properties. Additionally, combined-entity profiles may be populated with properties set to mimic fraudulent or suspicious activities instead of including the statistical baselines, so that comparisons can be made to how close to being suspicious an entity's relationships are.

The enriched relationships and aggregated metrics are analyzed at OPERATION 260 to determine a level of suspicion for an entity. Levels of suspicion indicate how likely an entity is believed to be engaged in fraud based on the analysis of information from the enriched relationship records according to auditing rules. That is, an auditing rule may be used to determine how far from the norm (or how close to being suspicious) an entity's relationships are to indicate whether the entity is likely engaged in fraud. In various examples, an entity may have a base level of suspicion from a previous audit, which may be raised or lowered in future audits.

As will be appreciated, some variation from the norm is expected, and absence of variation may be suspicious in itself, therefore the auditing rules work in conjunction with auditing thresholds (both for specific rules and combined) before determining that a given aspect of an entity's enriched relationship record warrants adjusting a suspicion level for the entity.

Method 200 then proceeds to OPERATION 270, where a report is generated. In various examples, the report provides various levels of detail regarding the analysis of the enriched relationships and aggregated metrics performed in OPERATION 260, and the report may be organized according to various formats. In one example, the report provides a go/no-go recommendation on whether to treat an entity as suspicious or to flag it for further analysis. In another example, the report provides an infographic detailing the level of suspicion determined for each property of the enriched relationship profile record, and provides natural language descriptions of how/why the suspicion levels were determined.

Method 200 concludes at END 299.

Figure 3:
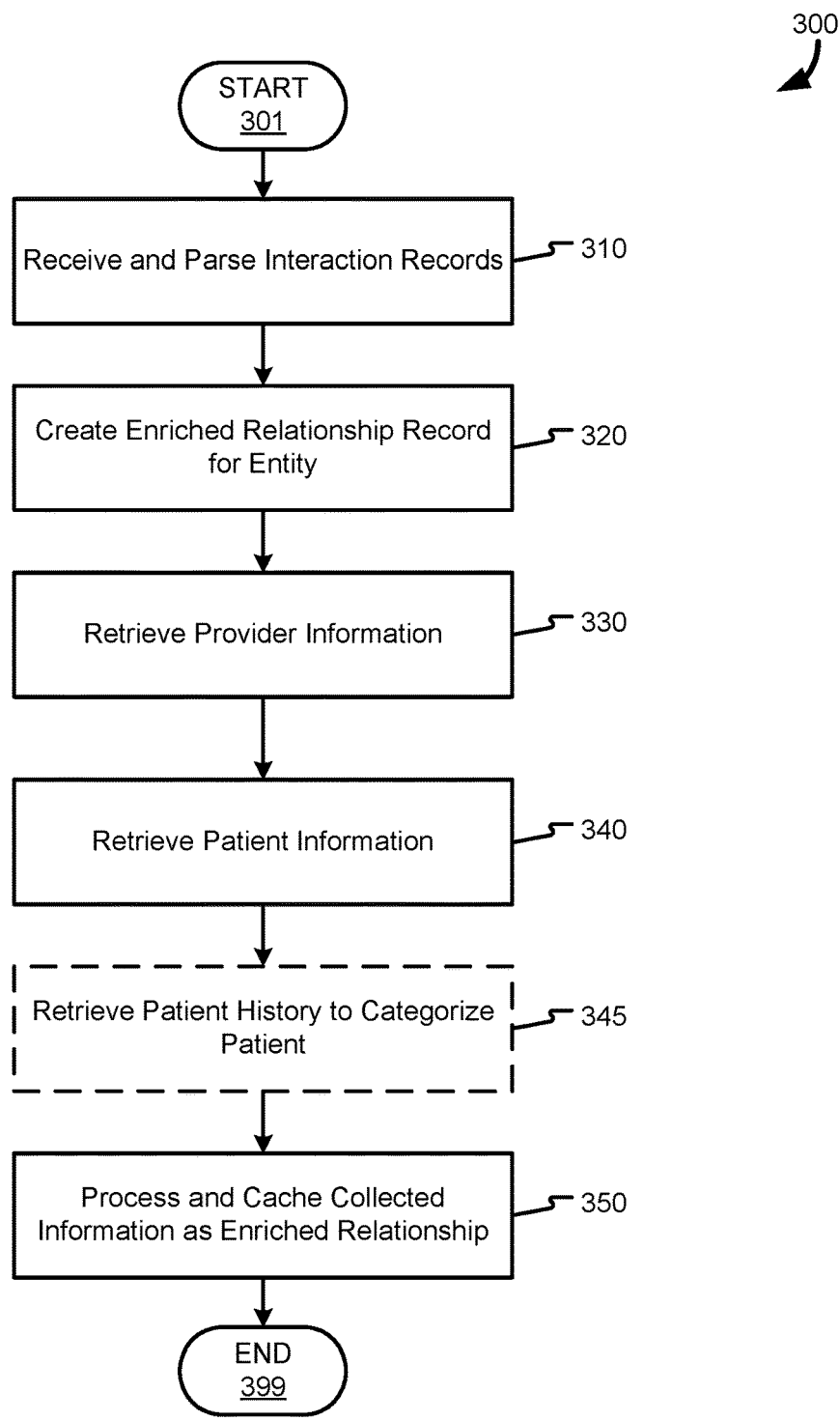
FIG. 3 illustrates a flow chart for an example method to create an enriched relationship record.

FIG. 3 illustrates a flow chart for an example method 300 to create an enriched relationship record. As will be understood, when an entity already has an enriched relationship record, the enriched relationship record may be updated or re-created.

Method 300 begins at START 301 and proceeds to OPERATION 310 where interaction records and received and parsed to identify the entities and the interaction in the record. Two or more entities and at least one interaction are parsed from the interaction record. Entities may comprise persons or organizations, and fall within two categories: providers, who provide healthcare services, and patients, who receive or pay for healthcare services. The interaction may include, for example: the request for services, the services provided, request for payment for the services, receipt of payment for the services, credit checks, determinations of eligibility, etc., and details how the entities interacted.

Method 300 then proceeds to OPERATION 320, where enriched relationship records are created for the parsed entities. According to aspects, a check is made to determine whether an entity already has an enriched relationship record to update that record before creating/re-creating the enriched relationship record for the entity. At OPERATION 320, a unique identifier may be created or selected for the entity.

Because persons who are providers may also be patients (e.g., doctors may both provide and receive healthcare), the unique identifier may include a category field, operable to identify a type of entity via its unique identifier. For example, a unique identifier for a nurse may be based on the nurse's SSN of "123-45-6789," but include a category field for each role the nurse has in the healthcare field, such that, for the provider role the unique identifier is "Pr-123-45-6789" and for the patient role is "Pa-123-45-6789." By using a shared base for a unique identifier, information may be more easily retrieved from provider information sources and patient information sources for the entity. For example, information from a provider information database 120, like a work address, may be used to populate patient information for an individual who is an ambulance driver (i.e., also a provider) by using the base with a different category field. Other unique identifiers and category fields are possible, and the above are given as non-limiting examples.

Method 300 proceeds to OPERATION 330, where provider information is retrieved. Provider information may be retrieved from several sources, collectively referred to as provider information databases 120. For example, provider information may be retrieved from interaction records (e.g., provider name, provider location, provider insurance number, etc.), a Secretary of State's website, a Department of Health's database, etc. Provider information may include, but is not limited to: red flags, certifications, business information, previous businesses, and previous suspicion levels. Red flags include indications of inconsistent information (e.g., conflicting addresses for place of business from different sources of provider information), complaints (e.g., to the Better Business Bureau, to a Medical Licensing board, etc.), lawsuits, and user-specified indicators of suspicious activity.

Method 300 proceeds to OPERATION 340, where patient information is retrieved. Patient information may be retrieved from several sources, collectively referred to as patient information databases 110. For example, patient information may be retrieved from interaction records (e.g., patient name, patient residence, patient SSN, etc.), interaction records from other providers, insurance registration forms, credit agencies, provider databases 120, etc. Patient information may include personally identifiable information, demographic information, lifestyle information, credit history, and other information that provides a snapshot of the patient's current status.

Method 300 may optionally proceed to OPERATION 345 or bypass OPERATION 345 to proceed to OPERATION 350.

At OPERATION 345, patient history is retrieved to categorize the patient. Patient history may be used to determine expected medical services for a patient entity. For example, prior interaction records may be collected and processed to determine trends in services received by a patient, such as, receiving dialysis on a weekly basis, requesting a prescription for allergy medication every spring, or visiting an orthopedic specialist twice in the past month. The trends may be used to categorize a patient and identify likely future medical services to be requested. For example, a patient receiving weekly dialysis may also incur weekly non-emergency ambulance services, a patient requesting allergy medication in prior years will likely do so again at the start of allergy season, and a patient visiting an orthopedic specialist may see a physical therapist in the future.

According to aspects, patient histories may be used to adjust weights/thresholds or set exceptions during an audit. For example, a patient history that indicates that the patient travels extensively (e.g., has numerous addresses, several interaction records in far-flung locations, etc.) may provide an exception to an audit rule for "distance between patient and provider" when auditing a provider, as any provider treating the patient is not acting out of the ordinary.

At OPERATION 350, the collected information is processed and cached as an enriched relationship. In various aspects, enriched relationships are used to form an enriched relationship record focused on a particular entity. The enriched relationship record may contain profile information specific to the particular entity (e.g., name, unique identifier, address, etc.) as well as correlations to other entities that are related via interactions. The enriched relationship record may include aggregated metrics for the related entities, which indicate various statistical analyses of properties of the related entities.

For example, an aggregated metric may provide a statistical baseline for the related entities of the focus entity, which may be compared to a statistical baseline of a control entity, similar entity, or combined-entity record during an audit. For example, the patients (the related entities) who use an ambulance service (the focus entity) may each include a "distance traveled to treatment" property that is analyzed to determine the mean of the property (the aggregated metric) to determine the average "distance traveled to treatment" for the ambulance company. Statistical baselines, in various examples, may include, but are not limited to: mean, median, mode, range, distribution, and central tendency.

Aggregated metrics may also indicate a percentage or count of related entities that have a value for a property that violates a statistical rule compared to the statistical baseline for the entity. For example, a baseline for a "distance traveled to treatment" may be used with a "within three standard deviations" statistical rule to count the number of patients who have a "distance traveled to treatment" value greater or less than three standard deviations of the baseline, which would be expected to encompass 99.7% of a population normally distributed according distance. Statistical rules, in various example, may include, but are not limited to: standard deviations ($1\sigma$, $1.5\sigma$, $6\sigma$, etc.), trend analysis (e.g., runs), and pattern identification.

The enriched relationship record may be cached according to various formats or layouts in an enriched relationship database. In various examples, the aggregated metrics may be cached as part of the enriched relationship record, or separately. Method 300 concludes at END 399.

Figure 4:
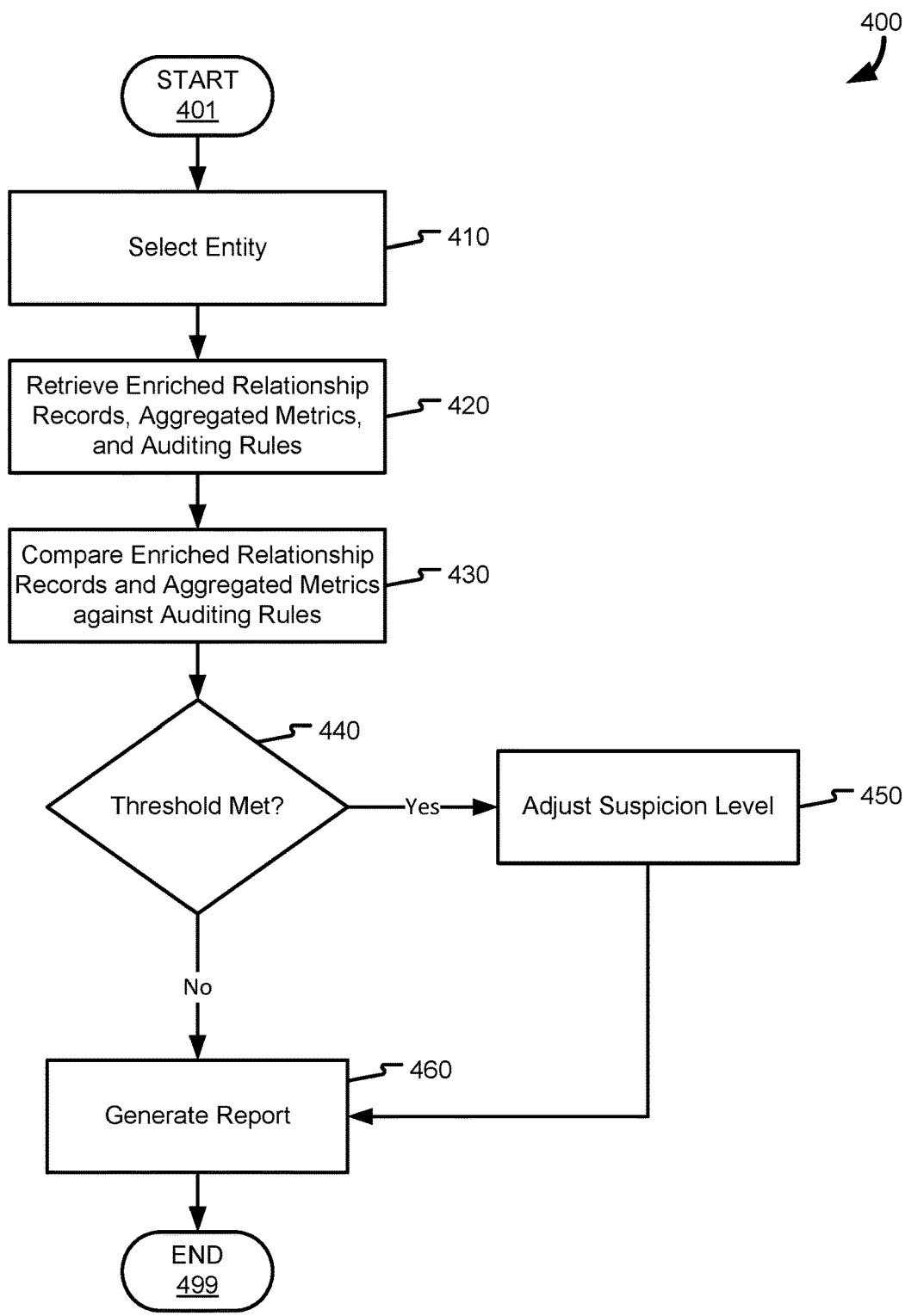
FIG. 4 illustrates a flow chart for an example method to perform an audit using enriched relationships.

FIG. 4 illustrates a flow chart for an example method 400 to perform a healthcare provider audit using enriched relationships. Method 400 begins at START 401 and proceeds to OPERATION 410, where an entity to audit is selected. An entity may be selected to audit based on several triggers, which may include the receipt of a new interaction record involving the entity, a periodic review (e.g., once a month), or via a user command.

Method 400 proceeds to OPERATION 420, where enriched relationship records, aggregated metrics, and auditing rules are retrieved. Enriched relationship records may be retrieved from an enriched relationship database 150, and auditing rules may be retrieved from a rules database 180. In some examples, the aggregated metrics may be cached as part of the enriched relationship record, and in other examples, the aggregated metrics are calculated as part of the audit. According to various aspects, enriched relationship records and aggregated metrics for entities other than the focused entity of the audit may be retrieved, such as, for example: a control entity (e.g., an entity with known good/suspicious information), a similar entity (e.g., a peer patient or provider), and a combined-entity profile (e.g., all providers in a region, all patients with shared gender, age, and lifestyle properties, etc.).

At OPERATION 430 the enriched relationship records and aggregated metrics are compared against the auditing rules. The violations of given auditing rules may be compared against a threshold specific to each rule or a combined threshold, to which each violation is compared against. Each violation may be weighted differently against specific or combined thresholds so that some violations or rules have a greater impact on the audit's findings.

When it is determined at DECISION OPERATION 440 that the number of violations meets the threshold, method 400 proceeds to OPERATION 450 where the suspicion level is adjusted. According to various aspects, a number of rules violations, as set by the thresholds, may be detected before an entity's enriched relationship profile is considered suspicious or its suspicion level is raised/lowered. In various examples, the weight of rules violations, or the thresholds, may be adjusted or exceptions applied to allow for greater variability of a property in a given audit before an adjustment is made.

Method 400 proceeds to OPERATION 460 where a report may be generated. In some examples, when the suspicion level for an entity is below a threshold, no report is generated; only alert reports are generated for suspicious entities. Reports may be generated according to several formats that include various levels of detail describing how suspicion levels were reached. Example reports may include natural language explanations of the suspicion level(s), graphs, infographics, and numeric scores, which may be provided to a user via a suitable display device (e.g., monitor, printer, speaker, etc.), cached, or passed to another system for further use and analysis.

Method 400 concludes at END 499.

Other systems may use the reports to expedite claims processing for unsuspicious entities, require additional review of claims for reimbursement from suspicious entities before processing them, alert users to the suspicion level, or focus auditing resources away from unsuspicious entities to suspicious entities.

FIG. 5 is a block diagram illustrating physical components of an example computing device 500 with which aspects may be practiced. The computing device 500 may include at least one processing unit 502 and a system memory 504. The system memory 504 may comprise, but is not limited to, volatile (e.g. random access memory (RAM)), non-volatile (e.g. read-only memory (ROM)), flash memory, or any combination thereof. System memory 504 may include operating system 505, one or more programming modules 506, and may include an investigation system 100 having sufficient computer-executable instructions, which when executed, perform functionalities as described herein. Operating system 505, for example, may be suitable for controlling the operation of computing device 500. Furthermore, aspects may be practiced in conjunction with a graphics library, other operating systems, or any other application program and is not limited to any particular application or system. This basic configuration is illustrated by those components within a dashed line 508. Computing device 500 may also include one or more input device(s) 512 (keyboard, mouse, pen, touch input device, etc.) and one or more output device(s) 514 (e.g., display, speakers, a printer, etc.).

The computing device 500 may also include additional data storage devices (removable or non-removable) such as, for example, magnetic disks, optical disks, or tape. Such additional storage is illustrated by a removable storage 509 and a non-removable storage 510. Computing device 500 may also contain a communication connection 516 that may allow computing device 500 to communicate with other computing devices 518, such as over a network in a distributed computing environment, for example, an intranet or the Internet. Communication connection 516 is one example of a communication medium, via which computer-readable transmission media (i.e., signals) may be propagated.

Components of the investigation system 100, such as the relationship enricher 140, aggregator 160, the auditing engine 170, and the reporter 190, may include routines, programs, sub-components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, program modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present disclosure may be used in various distributed computing environments where tasks are performed by remote processing devices that are linked through a communications network.

Aspects of the present disclosure may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 500 or any other computing devices 518, in combination with computing device 500, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the present disclosure as claimed in any way. The aspects, examples, and details provided in this application are considered sufficient to convey possession and enable those skilled in the art to practice the best mode of the disclosure as claimed. Descriptions of structures, resources, operations, and acts considered well-known to those skilled in the art may be brief or omitted to avoid obscuring lesser known or unique aspects of the subject matter of this application. The disclosure as claimed should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the disclosure as claimed.

I claim:

1. A method for improving efficiency for a computing device used to detect entities engaged in suspicious activity, comprising:
    collecting interaction records;
    parsing the interaction records to determine a first entity, a second entity, and an interaction between the first entity and the second entity for each of the interaction records;
    analyzing the parsed interaction records to produce an aggregated metric based on a statistical baseline of interactions between the first entity and the second entity;
    aggregating the interaction records that include a given first entity;
    generating an enriched relationship record that includes links to related entities and aggregated metrics corresponding to deviations from statistical baselines of properties of the related entities from the aggregated interaction records that include the given first entity;
    auditing the enriched relationship record for the given first entity according to a set of auditing rules that incorporate a rule/threshold pair with an adjustable threshold for each property of the enriched relationship record to determine a suspicion level for the given first entity, wherein the adjustable threshold for each property of the enriched relationship record allows a specified number of suspicious activities for a given property before flagging the given first entity as suspicious and/or raising a suspicion level for the given first entity to prevent false positives absent ignoring suspicious activities;
    storing the enriched relationship record in an enriched relationships database;
    generating a report based on the suspicion level; and
    transmitting the report to a third party.

2. The method of claim 1, wherein the statistical baseline is a mean value for all first entities parsed from the interaction records of the interaction between the first entity and each second entity.

3. The method of claim 1, wherein the statistical baseline is a mean value for all first entities that share a selected feature parsed from the interaction records of the interaction between the first entity and each second entity.

4. The method of claim 1, wherein the enriched relationship record for the given first entity includes a plurality of properties that correspond with an average number of interactions with other entities during a time period, an overall number of a given interaction type, and an average number of the given interaction type.

5. The method of claim 1, wherein the interaction records that include the given first entity are compared against the aggregated metric according to thresholds included in the set of auditing rules to determine whether the given first entity passes the set of auditing rules.

6. The method of claim 5, further comprising:
when the given first entity does not pass the set of auditing rules according to the thresholds, transmitting the report to the given first entity, wherein the report includes a request for additional information from the given first entity.

7. The method of claim 1, further comprising, when the enriched relationship record fails an auditing rule, providing a response window to the given first entity for a limited period of time in which the given first entity is allowed to respond to a request for additional information before allowing further action.

8. A system for improving efficiency for a computing device used to detect entities engaged in suspicious activity, comprising:
a processor; and
a memory storage device including instructions, which when executed by the processor cause the system to provide:
a relationship enricher, operable to collect information related to the entities and interactions between the entities, and further operable to process the collected information to produce an enriched relationship record that includes links to related entities and aggregated metrics corresponding to deviations from statistical baselines of properties of the related entities for a given entity based on a number of aggregated interaction records;
an aggregator, operable to statistically analyze a plurality of enriched relationship records to produce a statistical baseline for a property of the plurality of enriched relationship records, and further operable to produce an aggregated metric for the plurality of enriched relationship records based on the statistical baseline and a statistical rule;
an enriched relationships database to store the enriched relationship records;
an auditing engine, operable to audit the enriched relationship record for the given entity according to auditing rules that incorporate a rule/threshold pair with an adjustable threshold for each property of the enriched relationship record to produce a suspicion level for the given entity, wherein the adjustable threshold for each property of the enriched relationship record allows a specified number of suspicious activities for a given property before flagging the given entity as suspicious and/or raising a suspicion level for the given entity to prevent false positives for the audit absent ignoring suspicious activities; and
a reporter, operable to generate a report based on the suspicion level, wherein the reporter is further operable to transmit the report to a payor.

9. The system of claim 8, wherein the report is operable to affect a frequency of future reviews of interaction records that include the given entity.

10. The system of claim 8, wherein the suspicion level for the given entity is set so that the given entity is initially under suspicion, wherein repeated comparisons of the enriched relationship record for the given entity and the aggregated metric according to the auditing rules updates the suspicion level.

11. The system of claim 8, wherein when the suspicion level indicates that the given entity is under suspicion, the reporter is further operable to transmit the report to the payor before a payment is released to the given entity from the payor.

12. The system of claim 8, wherein when the suspicion level indicates that the given entity is under suspicion, the reporter is further operable to transmit a request for additional information to the given entity before a payment is released.

13. The system of claim 12, further comprising a response window which is provided for a limited period of time in which the given entity is allowed to respond to the request for additional information.

14. The system of claim 12, wherein the auditing engine is further operable to receive a response to the request for additional information from the given entity, and compare the response to the enriched relationship record to determine whether the response includes inconsistent data and thereby increase the suspicion level for the given entity.

15. A system for improving efficiency for a computing device used to detect entities engaged in suspicious activity, comprising:
a processor that generates an enriched relationship record that includes links to related entities and aggregated metrics corresponding to deviations from statistical baselines of properties of the related entities based on aggregated interaction records for an entity according to collected information related to patients, providers, and interactions between patients and providers that include the entity;
an enriched relationships database for storing the enriched relationship record; and
a first rules database for storing a statistical rule;
a second rules database for storing auditing rules;
wherein the processor further produces a statistical baseline by statistically analyzing a plurality of enriched relationship records to produce an aggregated metric for the plurality of enriched relationship records based on the statistical rule, wherein the processor audits the enriched relationship record for the entity according to the auditing rules that incorporate a rule/threshold pair with an adjustable threshold for each property of the enriched relationship record, wherein the adjustable threshold for each property of the enriched relationship record allows a specified number of suspicious activities for a given property before flagging the entity as suspicious and/or raising a suspicion level for the entity to prevent false positives for the audit absent ignoring suspicious activities; and
wherein the processor further compares each property of the enriched relationship record to a corresponding threshold to determine whether a property of the enriched relationship record is outside of the threshold, and when it is determined that the property of the enriched relationship record is outside of the corresponding threshold, generate a report indicating that the entity is suspicious, and transmit the report.

16. The system of claim 15, wherein the report is transmitted to a payor via at least one of:
a cellular interface;
a telephone interface; and
a network interface.

17. The system of claim 15, wherein the report is transmitted to the entity and includes a request for additional information to verify a consistency of information supplied by the entity.

18. The system of claim 15, wherein the entity is a person being provided services.

19. The system of claim 15, wherein the entity is a party providing services and requesting payment therefor.

20. The system of claim 15, wherein when the threshold is met, a suspicion level for the entity is adjusted and wherein the threshold sets when the suspicion level is lowered for the entity and when the suspicion level is raised for the entity.

* * * * *